(12) United States Patent
Yamaoka et al.

(10) Patent No.: US 12,337,479 B2
(45) Date of Patent: Jun. 24, 2025

(54) ROBOT SYSTEM AND ROBOT CONTROL DEVICE

(71) Applicant: FANUC CORPORATION, Yamanashi (JP)

(72) Inventors: Nobuaki Yamaoka, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 229 days.

(21) Appl. No.: 18/004,407

(22) PCT Filed: Jul. 26, 2021

(86) PCT No.: PCT/JP2021/027495
§ 371 (c)(1),
(2) Date: Jan. 5, 2023

(87) PCT Pub. No.: WO2022/024976
PCT Pub. Date: Feb. 3, 2022

(65) Prior Publication Data
US 2023/0278205 A1    Sep. 7, 2023

(30) Foreign Application Priority Data
Jul. 31, 2020   (JP) .................................. 2020-130055

(51) Int. Cl.
*B25J 9/16*   (2006.01)
(52) U.S. Cl.
CPC ........... *B25J 9/1633* (2013.01); *B25J 9/1653* (2013.01)
(58) Field of Classification Search
CPC ...... B25J 9/1633; B25J 9/1653; B25J 9/1687; B25J 13/08; G05B 2219/39529; G05B 2219/40032
See application file for complete search history.

(56) References Cited

U.S. PATENT DOCUMENTS

| | | | |
|---|---|---|---|
| 10,363,661 B2 * | 7/2019 | Ueda | B25J 9/1633 |
| 2005/0113971 A1 * | 5/2005 | Zhang | B25J 9/1687 |
| | | | 700/245 |

(Continued)

FOREIGN PATENT DOCUMENTS

| | | |
|---|---|---|
| JP | 2014-128857 A | 7/2014 |
| JP | 2014-233814 A | 12/2014 |
| WO | 2019/017416 A1 | 1/2019 |

OTHER PUBLICATIONS

International Search Report issued in PCT/JP2021/027495; mailed Oct. 12, 2021.

*Primary Examiner* — Adam R Mott
*Assistant Examiner* — Sagar Kc
(74) *Attorney, Agent, or Firm* — Studebaker Brackett PLLC

(57) ABSTRACT

The present invention makes it possible, in force control during production, to automatically adjust a force control parameter optimally so as not to cause oscillation of a robot or failure of work. This robot system comprises: a robot arm having a hand at the end thereof for holding a workpiece; a force detector for detecting a force and moment received by the workpiece held by the hand; and a control device for moving the workpiece held by the hand with respect to a target object while performing force control of the robot arm to correct a position error and an attitude error of the workpiece, on the basis of a predetermined force control parameter and a detected value of the force detector. The control device has a parameter automatic adjustment unit for automatically adjusting the force control parameter by executing the moving of the workpiece with respect to the target object a plurality of times. The parameter automatic adjustment unit automatically adjusts the force control parameter by executing the moving of the workpiece with respect to the target object from a plurality of attitude error (Continued)

directions among a plurality of position error directions and the plurality of attitude error directions.

7 Claims, 8 Drawing Sheets

(56) References Cited

U.S. PATENT DOCUMENTS

| | | | | |
|---|---|---|---|---|
| 2008/0267737 | A1* | 10/2008 | Hatanaka | B25J 9/1687 |
| | | | | 901/27 |
| 2010/0211204 | A1* | 8/2010 | Zhang | B25J 9/1687 |
| | | | | 901/50 |
| 2011/0093120 | A1* | 4/2011 | Ando | B25J 9/1638 |
| | | | | 700/260 |
| 2011/0225787 | A1* | 9/2011 | Sato | B25J 9/1687 |
| | | | | 29/407.01 |
| 2016/0052135 | A1* | 2/2016 | Motoyoshi | B25J 9/1687 |
| | | | | 29/281.6 |
| 2016/0297071 | A1* | 10/2016 | Nammoto | B25J 9/1664 |
| 2018/0071915 | A1* | 3/2018 | Khatib | B25J 9/1656 |

* cited by examiner

ROBOT SYSTEM AND ROBOT CONTROL DEVICE

TECHNICAL FIELD

The present disclosure relates to a robot system and a robot control device.

BACKGROUND ART

In a process for assembling parts by use of a robot, a fitting task, a surface alignment task and a search task are performed on a workpiece gripped by a hand at a distal end of the robot arm. The fitting task is a task of fitting the gripped workpiece into a fitting hole of a target object. The surface alignment task is a task of butting the gripped workpiece onto a flat surface of a target object to achieve surface alignment. The search task is a task of searching for a position for the gripped workpiece so that the workpiece matches a hole shape and phase of a target object.

Conventionally, in order to accurately execute an assembly task of parts by such a robot, a force detector that detects a force and moment received by the workpiece gripped by the hand is provided on the robot arm. When performing the assembly task, force control for the robot is performed so that a force applied to the workpiece matches a target force set by an operator, based on a value detected by the force detector. As types of force control, impedance control, damping control, and hybrid control are known.

In order to appropriately execute the task by performing force control for the robot, it is important to appropriately set force control parameters that define a relationship between a force applied to the workpiece and a behavior of the robot. In recent years, a technique for automatically adjusting the force control parameters by automatically executing force control a plurality of times has been known as well (see, for example, Patent Document 1).

Patent Document 1: Japanese Unexamined Patent Application, Publication No. 2014-128857

DISCLOSURE OF THE INVENTION

Problems to be Solved by the Invention

However, even if the automatic adjustment of the force control parameters is executed, there is a case where the adjusted force control parameters are not optimized. This is considered to be caused by a difference in conditions of force control and a difference in error directions for a position and posture of the robot between a time when the force control parameters are adjusted and a time when the robot is actually operated for production.

Further, depending on the position and posture of the robot, the shape of the hand or the like, an optimized value of a force control gain representing responsiveness of the force control may depend on a correcting direction of the position and posture. Therefore, if the force control parameters are adjusted on conditions of position and posture errors having a high oscillation limit of the robot, there is a case where the robot oscillates during production. If the robot oscillates, production quality may be affected. In the worst case, the robot itself, the hand, peripheral equipment or the like may be damaged.

Furthermore, in the case of the search task, when the force control parameters are adjusted, it is necessary to check an operation as to whether the correct position and posture can be found on a plurality of position and posture error conditions. If the checking is not performed on a plurality of error conditions during production, the searching may fail during the production.

Therefore, it is desirable, in force control during production, to automatically adjust a force control parameter optimally so as not to cause oscillation of a robot or failure of work.

Means for Solving the Problems

According to one aspect of the present disclosure, provided is a robot system including a robot arm having, at a distal end, a hand that grips a workpiece, a force detector that detects a force and moment received by the workpiece gripped by the hand, and a control device that moves the workpiece gripped by the hand with respect to a target object while performing force control for the robot arm to correct a position error and a posture error of the workpiece, based on a predetermined force control parameter and a value detected by the force detector. The control device has a parameter automatic adjustment unit that automatically adjusts the force control parameter by moving the workpiece with respect to the target object a plurality of times, and the parameter automatic adjustment unit automatically adjusts the force control parameter by moving the workpiece with respect to the target object from at least a plurality of posture error directions selected from a plurality of position error directions and the plurality of posture error directions.

According to another aspect of the present disclosure, provided is a robot control device which controls an operation of a robot arm having, at a distal end, a hand that grips a workpiece to thereby move the workpiece toward a target object, and performs force control for the robot arm to correct a position error and a posture error of the workpiece with respect to the target object, based on a predetermined force control parameter and a value detected by a force detector that detects a force and moment received by the workpiece gripped by the hand. The robot control device includes a parameter automatic adjustment unit that automatically adjusts the force control parameter by moving the workpiece with respect to the object a plurality of times. The parameter automatic adjustment unit automatically adjusts the force control parameter by moving the workpiece with respect to the target object from at least a plurality of posture error directions selected from a plurality of position error directions and the plurality of posture error directions.

Effects of the Invention

One aspect makes it possible, in force control during production, to automatically adjust a force control parameter optimally so as not to cause oscillation of a robot or failure of work.

PREFERRED MODE FOR CARRYING OUT THE INVENTION

Figure 1:
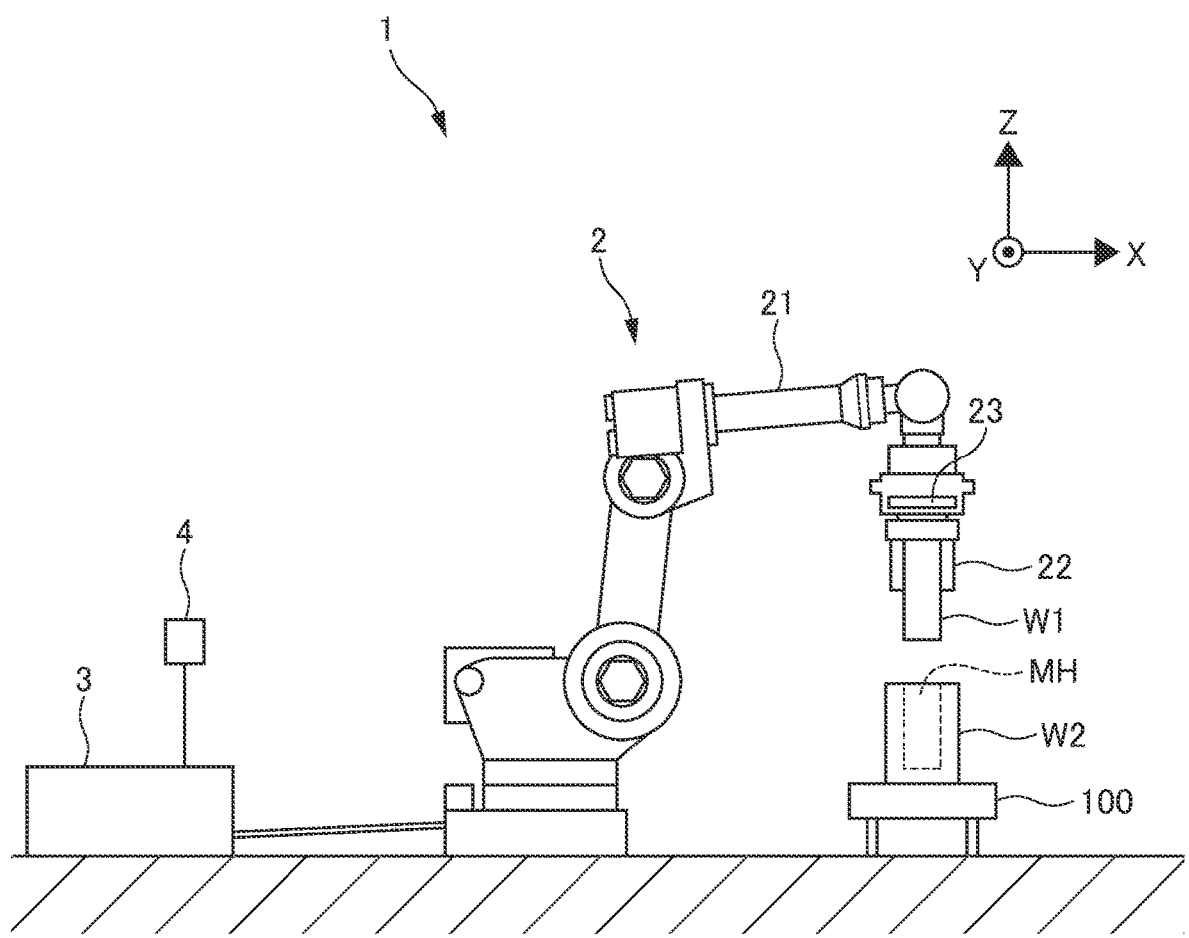
FIG. 1 is a schematic diagram showing a robot system that performs a fitting task.

Hereinafter, embodiments of the present disclosure will be described in detail with reference to the drawings. FIG. 1 is a schematic diagram showing a robot system 1 that performs a fitting task. The robot system 1 includes a robot 2, a robot control device 3 that controls the robot 2, and a teach pendant 4 for an operator to manually operate the robot 2 via the robot control device 3.

The robot 2 is a vertical articulated robot having a plurality of robot arms 21. The plurality of robot arms 21 are rotatably coupled by a plurality of drive shafts. Each drive shaft is rotationally driven by an actuator 24 (see FIG. 2) including a servo motor or the like controlled by the robot control device 3. At a distal end of each robot arm 21, a hand 22 and a force detector 23 are provided.

The hand 22 is driven and controlled by the robot control device 3, to grip a workpiece. In the fitting task, the workpiece includes a workpiece W1 gripped by the hand 22 and a workpiece W2 on a worktable 100. The workpiece W1 has, for example, a columnar shape. The workpiece W2 is a target object that is fitted with the workpiece W1 by an operation of the robot 2. The workpiece W2 has a columnar fitting hole MH capable of fitting with the workpiece W1. The workpiece W2 is placed on the worktable 100 so that an opening of the fitting hole MH faces upward.

The force detector 23 is disposed in the vicinity of a base portion of the hand 22. The force detector 23 detects a force and moment received by the workpiece W1 gripped by the hand 22. Specifically, the force detector 23 is configured of a force sensor. More specifically, the force detector 23 can use a 6-axis sensor capable of detecting translation forces in X, Y, Z-axis directions and moments around those axes. A value detected by the force detector 23 is output to a control unit 31 of the robot control device 3.

Figure 2:
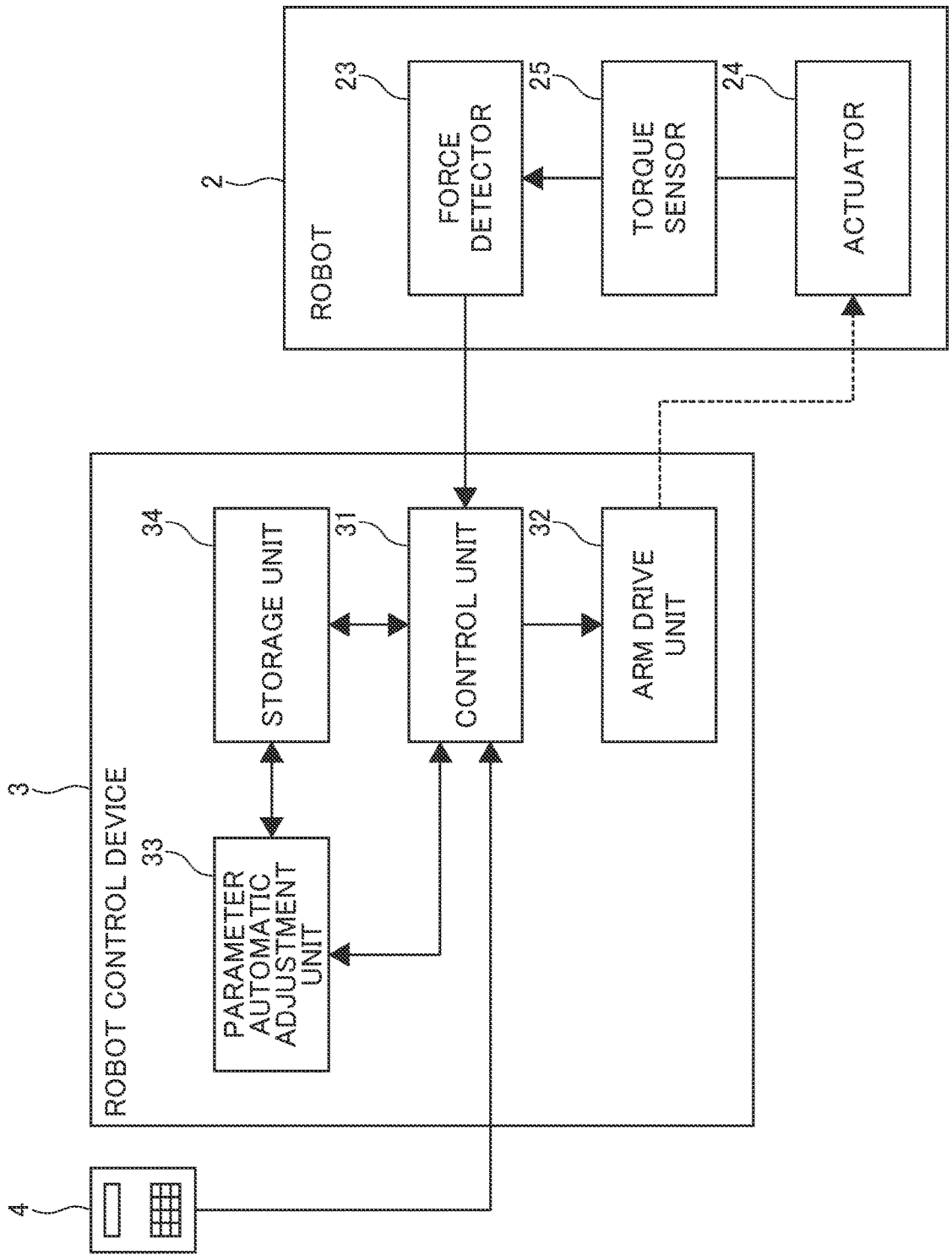
FIG. 2 is a functional block diagram showing an internal configuration of a robot and a robot control device.
Figure 3:
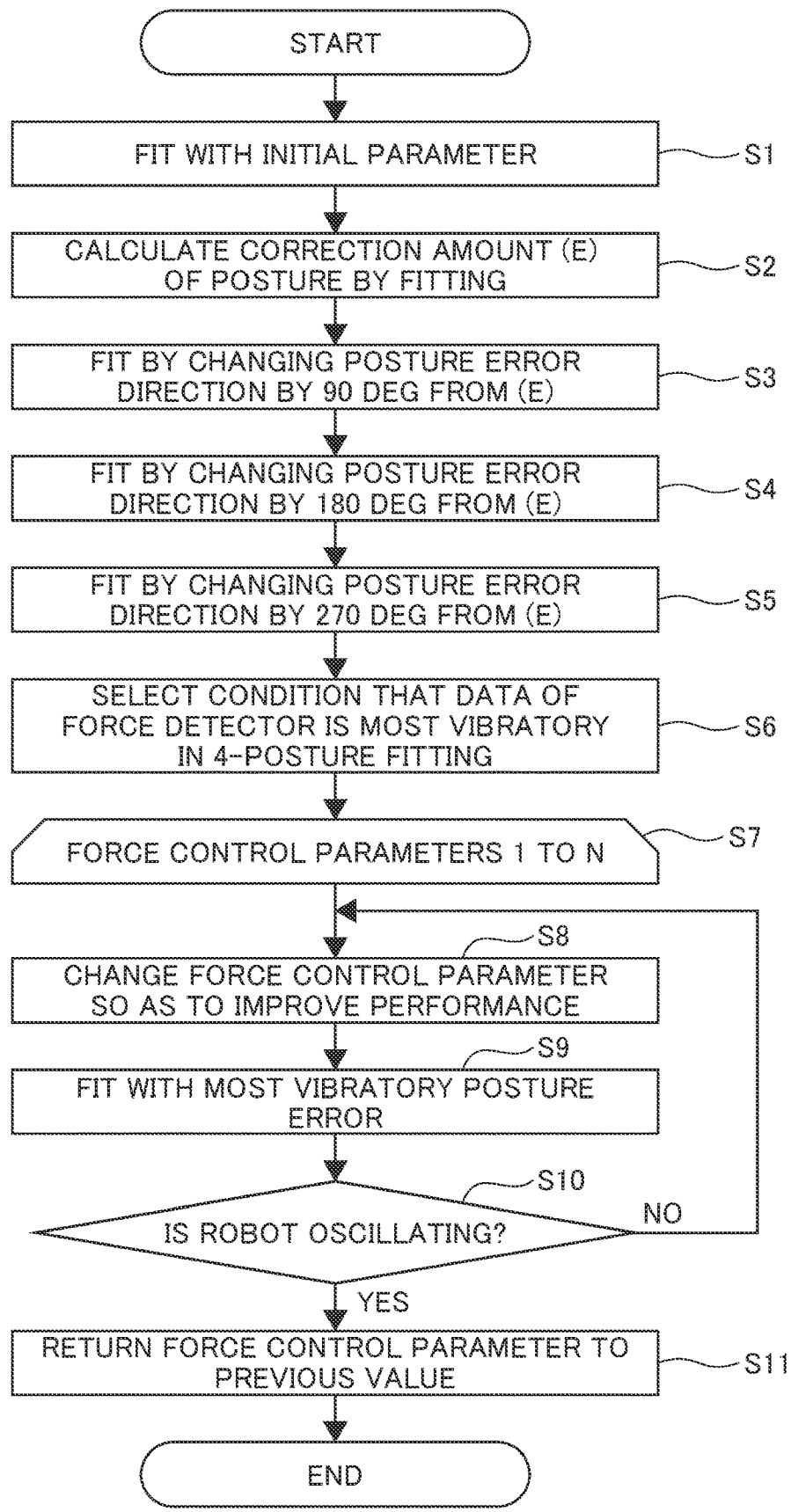
FIG. 3 is a flowchart showing an automatic adjustment task of a force control parameter.

As shown in FIG. 2, the robot control device 3 is configured to include the control unit 31, an arm drive unit 32, a parameter automatic adjustment unit 33, and a storage unit 34. The robot control device 3 includes a function as a control device for automatically adjusting the force control parameter in addition to a general function as a control device for controlling the operation of the robot 2. In this description, the function for automatically adjusting the force control parameter in the robot control device 3 will be described, and details of the general function for controlling the operation of the robot 2 will be omitted.

The control unit 31 is a controller that outputs, to the arm drive unit 32, a movement command based on a predetermined job and controls the operation of the robot 2. The control unit 31 moves the workpiece W1 with respect to the workpiece W2 while performing force control for the robot arms 21 so as to correct a position error and a posture error of the workpiece W1 gripped by the hand 22 based on a predetermined force control parameter stored in the storage unit 34 and the value detected by the force detector 23.

The arm drive unit 32 applies a driving current to the actuator 24 of each drive shaft of the robot 2 based on the movement command from the control unit 31. Thereby, each robot arm 21 of the robot 2 is driven, and the robot 2 changes its posture variously. As shown in FIG. 2, the robot 2 has a torque sensor 25 for detecting a torque of the actuator 24. The torque sensor 25 outputs, to the force detector 23, a value detected by the torque of the actuator 24. FIG. 2 only shows one actuator 24 and one torque sensor 25. However, a set of the actuator 24 and torque sensor 25 is provided on each of a plurality of drive shafts of the robot 2.

The parameter automatic adjustment unit 33 controls the operation of the robot 2 via the control unit 31 and automatically adjusts the force control parameter. The force control parameter includes a force control gain representing responsiveness of the force control for the robot 2, a speed command value, a force command value, and the like. The automatically adjusted force control parameter is overwritten with the force control parameter (initial parameter) stored in the storage unit 34. Details of a specific adjustment operation of the force control parameter by the parameter automatic adjustment unit 33 will be described later.

The teach pendant 4 is connected to the control unit 31 of the robot control device 3. The teach pendant 4 is manually operated by the operator to instruct execution of various operations such as reproduction of an operation program of the robot 2, teaching of the robot 2 by a jog operation, and automatic adjustment of the force control parameter. In FIG. 2, the teach pendant 4 is connected to the control unit 31 by a wire but may be connected wirelessly.

Next, further description will be made as to an automatic adjustment task of the force control parameter by the parameter automatic adjustment unit 33 of the robot control device 3, based on a flowchart shown in FIG. 3, and FIGS. 4 and 5A to 5D. The automatic adjustment task of the force control parameter by the parameter automatic adjustment unit 33 described below is executed by the instruction from the operator via the teach pendant 4, for example, at the time of initial start-up of the robot system 1, when a type of workpiece is changed, and when the hand 22 at the distal end of the robot arm 21 is replaced with a hand having a different structure.

First, the control unit 31 executes, a plurality of times, an operation of moving the workpiece W1 gripped by the hand 22 with respect to the workpiece W2 that is the target object and fitting the workpiece into the fitting hole MH of the workpiece W2 according to a predetermined parameter automatic adjustment flow by the parameter automatic adjustment unit 33. Specifically, the parameter automatic adjustment unit 33 reads the initial parameter of the force control parameter from the storage unit 34 during the operation of the robot 2 by the manual operation of the teach pendant 4 by the operator. Based on the initial parameter, the control unit 31 executes the first fitting operation of outputting the movement command to the arm drive unit 32 via the control unit 31 and operating the robot 2 to fit the workpiece W1 gripped by the hand 22 into the fitting hole MH of the workpiece W2 (Step S1).

Figure 4:
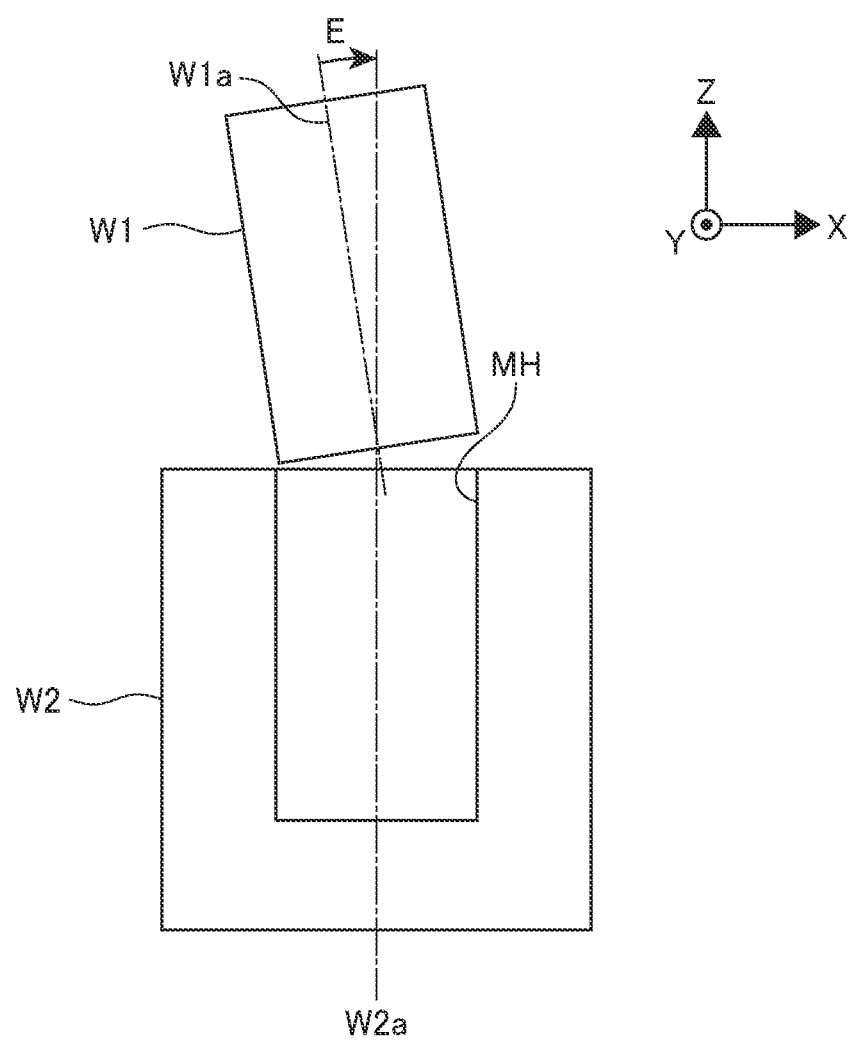
FIG. 4 is a side view showing a posture error between a workpiece and a target object during automatic adjustment of the force control parameter.
Figure 5A:
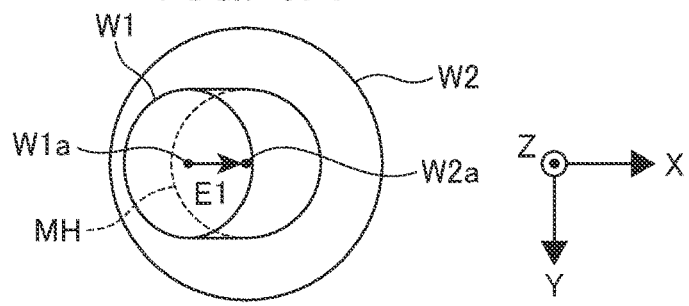
FIG. 5A is a plan view showing the posture error between the workpiece and the target object shown in FIG. 4.

FIG. 4 is a side view showing a state just before the workpiece W1 gripped by the hand 22 is fitted into the fitting hole MH of the workpiece W2 by way of the force control for the robot 2 with the initial parameter. FIG. 5A is a plan view. As shown in FIGS. 4 and 5A, when force control for the robot 2 is performed based on the initial parameter, the robot 2 shows a posture with the workpiece W1 being inclined and disposed with respect to the fitting hole MH. Specifically, an axis W1a of the workpiece W1 is inclined only by an angle E1 in a −X axis direction around the Y-axis (left direction of FIGS. 4 and 5A) with respect to an axis W2a of the fitting hole MH of the workpiece W2.

In order to properly fit the workpiece W1 into the fitting hole MH, the robot 2 needs to show a posture with the axis W1a of the workpiece W1 and the axis W2a of the fitting hole MH being matched. Therefore, the angle E1 represents a posture error that the robot 2 should correct at start of fitting. The angle E1 is an amount of change in posture of the robot 2 that is required to properly fit the workpiece W1 into the fitting hole MH, that is, a correction amount (E) of the posture error.

Here, if a rotation matrix representing the robot posture at the start of fitting is TA and a rotation matrix representing the robot posture after the fitting is TB, inv(TB)×TA is a rotation matrix representing the correction amount (E) of the posture error. The inv represents an inverse matrix. The parameter automatic adjustment unit 33 calculates the correction amount (E) of the posture error and stores the amount in the storage unit 34 (Step S2).

Note that a threshold of the correction amount of the posture error is set to the parameter automatic adjustment unit 33 in advance. When an absolute value of the correction amount (E) of the posture error calculated in Step S2 is equal to or less than the threshold, the parameter automatic adjustment unit 33 sets the correction amount (E) of the posture error to a predetermined value. This is because the posture error is intentionally given in a case where there is no posture error or a case where the posture error is excessively small. The predetermined value is, for example, a threshold. Specifically, when the threshold is set to 0.5 degree and the correction amount of the posture error calculated in Step S2 is 0.5 degree or less, the correction amount (E) of the posture error is set to 0.5 degree.

Next, the control unit 31 executes the second fitting operation by changing the posture error direction at the same position as when the first fitting operation is executed and with the same absolute value as that of the correction amount (E) of the posture error of the robot 2 (Step S3).

Figure 5B:
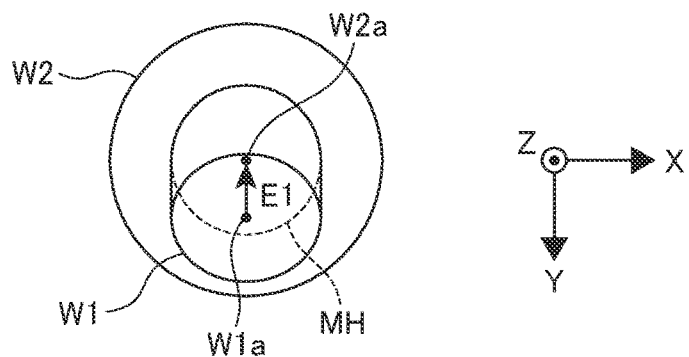
FIG. 5B is a plan view showing the workpiece and the target object in a posture error direction different from that in FIG. 5A by 90 degrees.

In this Step S3, the parameter automatic adjustment unit 33 executes fitting from the posture indicated by a rotation matrix of TB×T(90)×inv(TB)×TA. The T(90) is a matrix that rotates by 90 degrees around a fitting direction (around the axis W2a of the fitting hole MH) for the first fitting operation. Thereby, as shown in FIG. 5B, the robot 2 performs fitting from a position where the axis W1a of the workpiece W1 is tilted only by the angle E1 in a +Y axis direction around the X-axis (downward direction of FIG. 5B) with respect to the axis W2a of the fitting hole MH of the workpiece W2.

Next, the control unit 31 executes the third fitting operation by changing the posture error direction again at the same position as when the second fitting operation is executed and with the same absolute value as that of the correction amount (E) of the posture error of the robot 2 (Step S4).

Figure 5C:
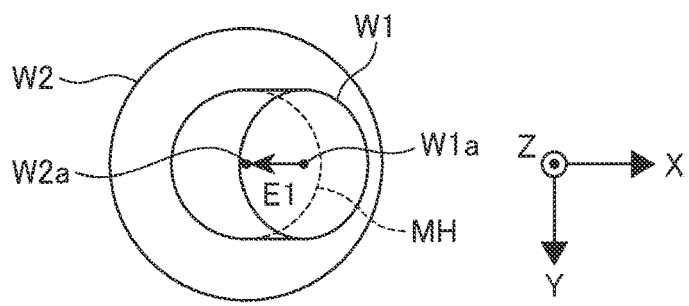
FIG. 5C is a plan view showing the workpiece and the target object in a posture error direction different from that in FIG. 5A by 180 degrees.

In this Step S4, the parameter automatic adjustment unit 33 executes fitting from a posture indicated by a rotation matrix of TB×T(180)×inv(TB)×TA. The T(180) is a matrix that rotates by 180 degrees around the fitting direction (around the axis W2a of the fitting hole MH) for the first fitting operation. Thereby, as shown in FIG. 5C, the robot 2 performs fitting from a position where the axis W1a of the workpiece W1 is tilted only by the angle E1 in a +X axis direction around the Y-axis (right direction of FIG. 5C) with respect to the axis W2a of the fitting hole MH of the workpiece W2.

Next, the control unit 31 performs the fourth fitting operation by changing the posture error direction again at the same position as when the third fitting operation is executed and with the same absolute value as that of the correction amount (E) of the posture error of the robot 2 (Step S5).

Figure 5D:
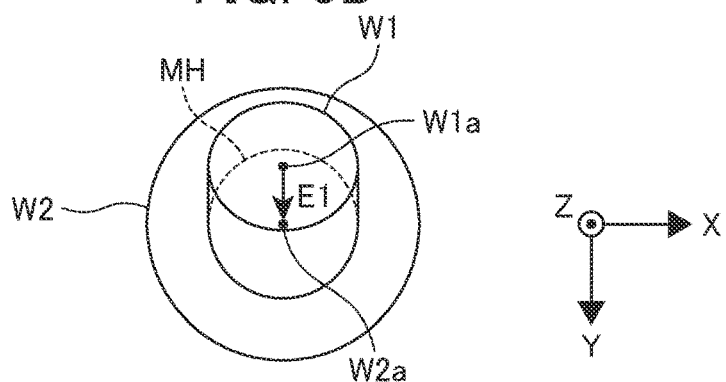
FIG. 5D is a plan view showing the workpiece and the target object in a posture error direction different from that in FIG. 5A by 270 degrees.

In this Step S5, the parameter automatic adjustment unit 33 executes fitting from a posture indicated by a rotation matrix of TB×T(270)×inv(TB)×TA. The T(270) is a matrix that rotates by 270 degrees around the fitting direction (around the axis W2a of the fitting hole MH) for the first fitting operation. Thereby, as shown in FIG. 5D, the robot 2 performs fitting from a position where the axis W1a of the workpiece W1 is tilted only by the angle E1 in a −Y axis direction around the X-axis (upward direction of FIG. 5D) with respect to the axis W2a of the fitting hole MH of the workpiece W2.

In each fitting operation from the first fitting operation to the fourth fitting operation, the parameter automatic adjustment unit 33 records the value detected by and output from the force detector 23 via the control unit 31. After the four-direction (four-posture) fitting operations are ended, the parameter automatic adjustment unit 33 obtains a vibration amount from the value detected by the force detector 23 during each fitting operation and selects the direction (posture) in which data of the value detected is the most vibratory (Step S6).

As a method of obtaining the vibration amount, there is, for example, a method of performing Fourier transform of the value detected by the force detector 23 and obtaining an amplitude of a specific frequency based on the result. Further, the vibration amount may be obtained by obtaining a maximum value or an average value of a change amount of the value detected by the force detector 23.

In Step S6, the parameter automatic adjustment unit 33 selects the direction (posture) in which the data of the value detected by the force detector 23 is the most vibratory, then obtains force control parameters 1 to N adjusted only with the posture error of the direction (posture) (Step S7) and changes each force control parameter so as to improve performance (Step S8). The N indicates the number of types of force control parameters. The type of force control parameter includes a force control gain, speed command value, force command value, and the like. The adjustment of the force control parameter may be performed on these parameter types one by one or may be performed simultaneously on a plurality of types of parameters.

In this way, after changing the force control parameter in Step S8, the control unit 31 operates the robot 2 so as to fit the workpiece W1 into the fitting hole MH of the workpiece W2 again with the posture error of the direction (posture) that is the most vibratory among the fitting operations in four directions (four postures) (Step S9).

If the force control parameter is excessively changed so as to improve the performance of the force control, instability of the robot 2 such as increase in vibration is likely to be incurred. For example, when the force control gain is increased, response to the generated force becomes faster, so that the correction of the posture error during fitting is accelerated, and a time required for the fitting is shortened. On the contrary, if the force control gain is excessively increased, noise may be amplified and the robot 2 may oscillate. Therefore, after executing the fitting operation in Step S9, the parameter automatic adjustment unit 33 obtains the vibration amount from the value detected by the force detector 23 by the method described above, to determine whether the robot 2 is oscillating (Step S10). It may be determined whether the robot 2 oscillates, for example, by the fact that the vibration amount becomes larger than the vibration amount at the time of the previous parameter automatic adjustment or that the threshold of the preset vibration amount is exceeded.

In Step S10, when it is determined that the robot 2 is not oscillating (Step S10; NO), the parameter automatic adjustment unit 33 returns to processing from Step S8. Specifically, the parameter automatic adjustment unit 33 changes the force control parameter so as to further improve the performance of the force control parameter, and then executes the fitting operation again with the posture error that is the most vibratory. Thereafter, in Step S10, it is determined again whether the robot 2 is oscillating. The processing of Steps S8 and S9 is repeated until it is determined in Step S10 that the robot 2 is oscillating.

On the other hand, when it is determined in Step S10 that the robot 2 is oscillating (Step S10; YES), the parameter automatic adjustment unit 33 returns the changed force control parameter to the previous value (Step S11).

Thereby, the force control parameter is set to a value of limitation that does not cause the robot 2 to oscillate. The parameter automatic adjustment unit 33 outputs the set force control parameter to the storage unit 34 for overwriting and saving, and then ends the automatic adjustment task of the force control parameter.

In the case of a vertical articulated robot such as the robot 2, a degree of vibration changes depending on an operating direction. Further, depending on the shape of the hand 22 provided at the distal end of the robot arm 21, there may be an operation that is likely to vibrate. When the robot 2 vibrates, the performance of the force control changes. However, as described above, in the robot system 1, the parameter automatic adjustment unit 33 automatically adjusts the force control parameter by moving the workpiece W1 from a plurality of posture error directions. The parameter automatic adjustment unit 33 adjusts the force control parameter on a condition that the posture error is the most vibratory in a plurality of posture error directions. Thereby, the robot 2 performs the fitting operation based on the force control parameter with which the fitting operation can be stably performed on the severest posture error condition, and hence a stable fitting operation can be executed even on the condition of another posture error with a loose condition. Therefore, the robot system 1 and the robot control device 3 make it possible, in the force control during the production, to automatically adjust the force control parameter optimally so as not to cause the oscillation of the robot 2 or failure of the fitting task.

The robot arm 21 includes the actuator 24 that drives the robot arm 21, and the torque sensor 25 that detects the torque of the actuator 24, and the force detector 23 detects the force and moment received by the workpiece W1 based on the value detected by the torque sensor 25. Therefore, the force and moment received by the workpiece W1 can be easily detected from the torque of the actuator 24.

The force detector 23 may also detect the force and moment received by the workpiece W1 based on a value of a current applied to the actuator 24. Thereby, the torque sensor 25 does not necessarily have to be provided, and hence the configuration of the robot 2 can be simplified.

Figure 6:
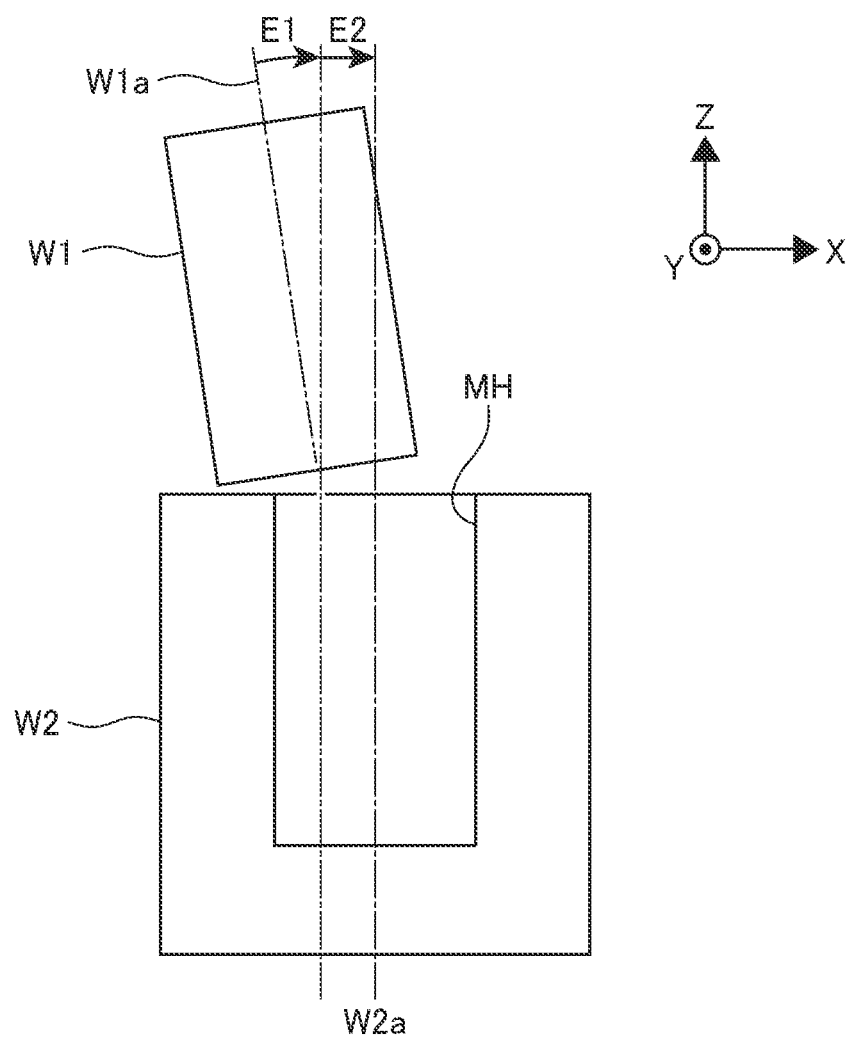
FIG. 6 is a side view showing a position error between the workpiece and the target object during the automatic adjustment of the force control parameter.

In the above embodiment, the parameter automatic adjustment unit 33 automatically adjusts the force control parameter by moving the workpiece W1 from a plurality of posture error directions. However, as shown in FIG. 6, the parameter automatic adjustment unit 33 may automatically adjust the force control parameter by moving the workpiece W1 from both of a plurality of position error directions and a plurality of posture error directions. In the case shown in FIG. 6, when the force control for the robot 2 is performed based on the initial parameter, the robot 2 shows a posture with the workpiece W1 being inclined and disposed with respect to the fitting hole MH, and slightly shifts to a side from a center of the fitting hole MH. Specifically, the axis W1$a$ of the workpiece W1 is tilted only by the angle E1 in the -X axis direction around the Y-axis (the left direction of FIG. 6) with respect to the axis W2$a$ of the fitting hole MH of the workpiece W2, and the workpiece W1 shifts only by a distance E2 in the -X axis direction with respect to the axis W2$a$ of the fitting hole MH.

Figure 7:
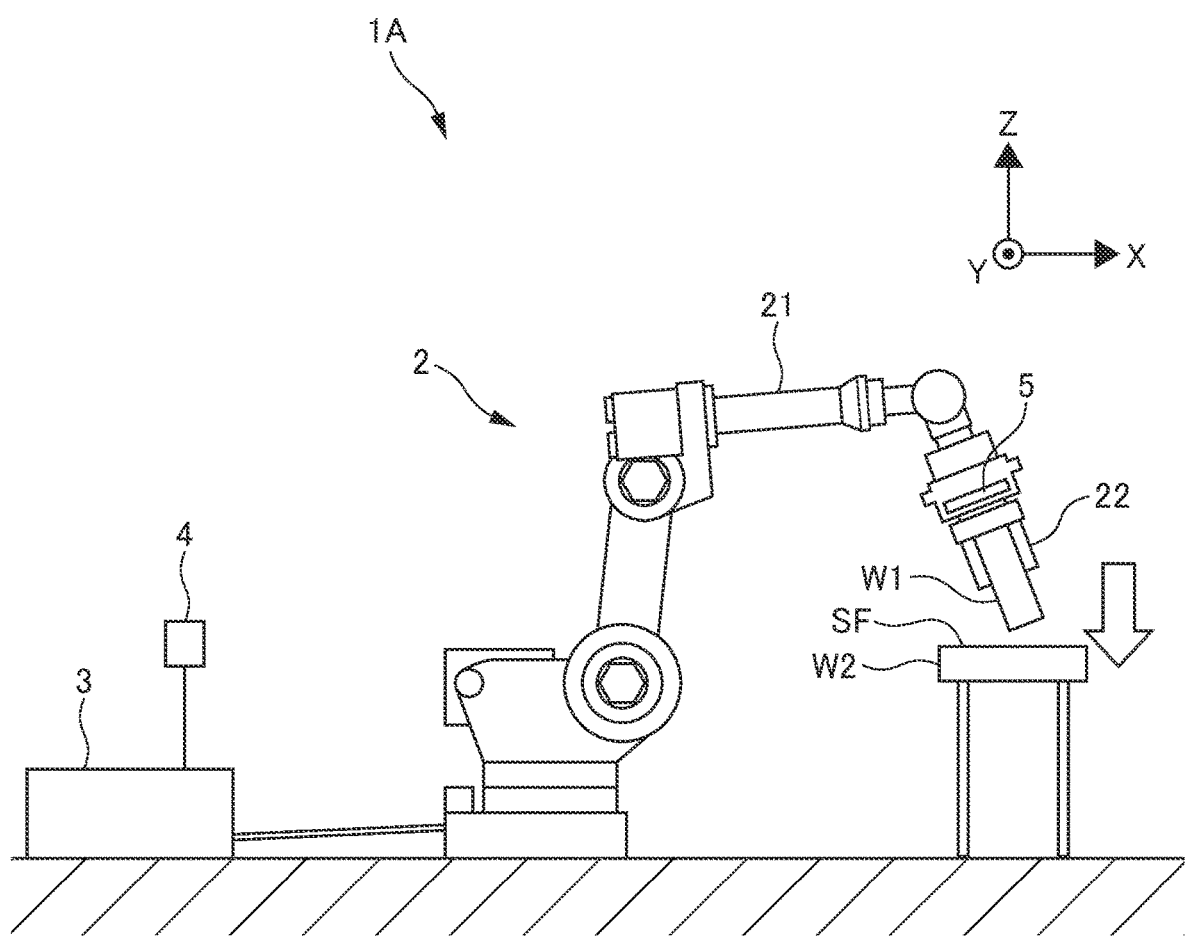
FIG. 7 is a schematic diagram showing a robot system that performs a surface alignment task.
Figure 8:
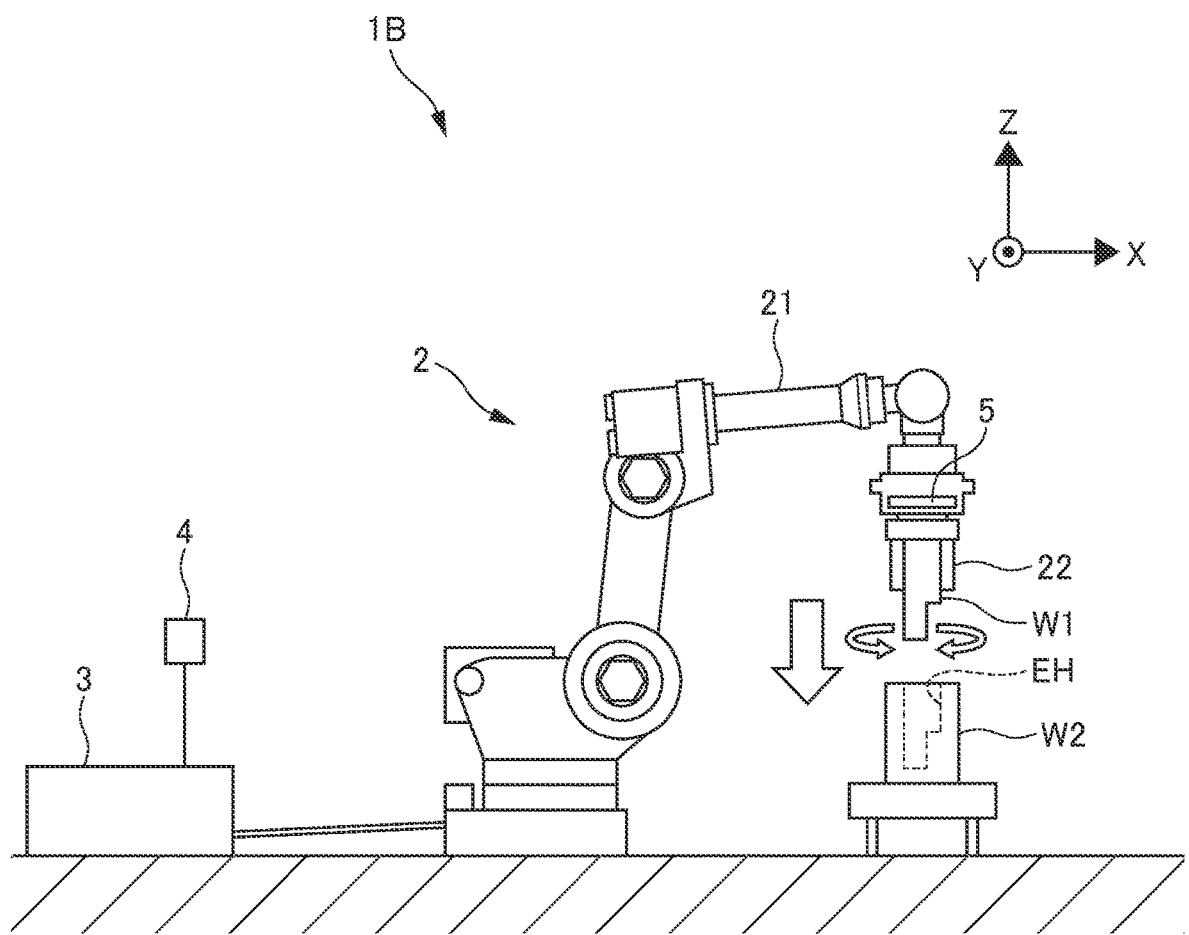
FIG. 8 is a schematic diagram showing a robot system that performs a search task.

In the above embodiment, description is made as to a case where an operation of moving the workpiece W1 with respect to the workpiece W2 by the robot 2 is a fitting operation of fitting the workpiece W1 into the fitting hole MH the workpiece W2 has. However, the operation of moving the workpiece W1 with respect to the workpiece W2 by the robot 2 may be a surface alignment operation of aligning the surface of the workpiece W1 gripped by the hand 22 with a flat surface SF of the workpiece W2, as in a robot system 1A shown in FIG. 7. Furthermore, the operation of moving the workpiece W1 with respect to the workpiece W2 by the robot 2 may be a search operation of causing the workpiece W1 to search so as to match a shape and phase of an engagement hole EH the workpiece W2 has, as in a robot system 1B shown in FIG. 8.

In the above embodiment, the moving of the workpiece W1 with respect to the workpiece W2 during the automatic adjustment of the force control parameter is executed from four directions (four postures) changed by 90 degrees each time. However, the directions (postures) to be changed are not limited to the four and may be two or more directions (postures). Also, the angle to be changed is not limited to 90 degrees.

In the above embodiment, the parameter automatic adjustment unit 33 that automatically adjusts the force control parameter is provided in the robot control device 3 that is electrically connected to the robot 2 to control the operation of the robot 2. However, the function of the parameter automatic adjustment unit 33 of the robot control device 3 or all functions of the robot control device may be achieved by an external terminal such as a personal computer (PC) or a tablet terminal.

EXPLANATION OF REFERENCE NUMERALS 1, 1A, 1B: robot system
2: robot
21: robot arm
22: hand
23: force detector
24: actuator
25: torque sensor
3: robot control device
31: control unit
33: parameter automatic adjustment unit
W1: workpiece
W2: workpiece (target object)
MH: fitting hole SF: flat surface EH: engagement hole

The invention claimed is:

1. A robot system comprising:
a robot arm having, at a distal end, a hand that grips a workpiece,
a force detector that detects a force and moment received by the workpiece gripped by the hand, and
a control device that moves the workpiece gripped by the hand with respect to a target object while performing force control for the robot arm to correct a position error and a posture error of the workpiece, based on a predetermined force control parameter and a value detected by the force detector,
wherein the control device has a processor unit that is configured to automatically adjust the force control parameter by moving the workpiece with respect to the target object a plurality of times,
the processor is configured to automatically adjust the force control parameter by moving the workpiece with respect to the target object from at least a plurality of posture error directions, and
the processor is configured to move the workpiece with respect to the target object from at least the plurality of posture error directions, and is configured to automatically adjust the force control parameter on a condition that the value detected by the force detector is most vibratory among the directions.

2. The robot system according to claim 1, wherein an operation of moving the workpiece with respect to the target object is one of a fitting operation of fitting the workpiece into a fitting hole of the target object, a surface alignment operation of aligning a surface of the workpiece with a flat surface of the target object, and a search operation of causing the workpiece to search so as to match a shape of an engagement hole of the target object.

3. The robot system according to claim 1, wherein the force detector is a force sensor.

4. The robot system according to claim 1, wherein the robot arm has an actuator that drives the robot arm, and a torque sensor that detects a torque of the actuator, and the force detector detects the force and moment received by the workpiece based on a value detected by the torque sensor.

5. The robot system according to claim 1, wherein the robot arm has an actuator that drives the robot arm, and the force detector detects the force and moment received by the workpiece based on a value of a current applied to the actuator.

6. A robot control device which controls an operation of a robot arm having, at a distal end, a hand that grips a workpiece to thereby move the workpiece toward a target object, and performs force control for the robot arm to correct a position error and a posture error of the workpiece with respect to the target object, based on a predetermined force control parameter and a value detected by a force detector that detects a force and moment received by the workpiece gripped by the hand, the robot control device comprising
a processor that is configured to automatically adjust the force control parameter by moving the workpiece with respect to the object a plurality of times,
wherein the processor is configured to automatically adjust the force control parameter by moving the workpiece with respect to the target object from at least a plurality of posture error directions, and
the processor is configured to move the workpiece with respect to the target object from at least the plurality of posture error directions, and is configured to automatically adjust the force control parameter on a condition that the value detected by the force detector is most vibratory among the directions.

7. The robot control device according to claim 6, wherein an operation for moving the workpiece with respect to the target object is one of a fitting operation of fitting the workpiece into a hole of the target object, a surface alignment operation of aligning a surface of the workpiece with a flat surface of the target object, and a search operation of causing the workpiece to search so as to match a shape of an engagement hole of the target object.

* * * * *